Figure 1:
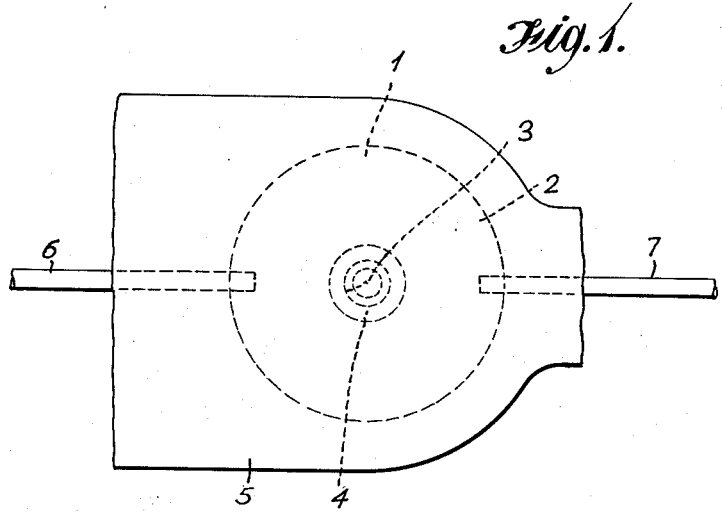

Aug. 6, 1963  E. J. G. BEESON ETAL  3,100,168
QUARTZ-TO-METAL SEALS
Filed Jan. 10, 1962

INVENTORS
ERIC JOHN GEORGE BEESON
HORACE EDWARD STANYON
LESLIE JOHN CAPP

ATTORNEY

3,100,168
QUARTZ-TO-METAL SEALS

Eric John George Beeson and Horace Edward Stanyon, Leicester, and Leslie John Capp, Daventry, England, assignors to Associated Electrical Industries Limited, London, England, a British company
Filed Jan. 10, 1962, Ser. No. 165,363
Claims priority, application Great Britain Jan. 10, 1961
2 Claims. (Cl. 154—2.4)

The present invention relates to quartz-to-metal seals suitable for the sealing of lead-in conductors to the envelopes of high pressure electric discharge lamps, the filling of which comprises gas and/or metal vapour.

Quartz-to-metal seals of high current-carrying capacity have previously been made by using concentric tubes of quartz, and sealing a plurality of strips of molybdenum foil extending axially between the tubes, the strips being connected electrically in parallel in order to convey current through the seal. British Patent No. 525,965 discloses one such construction of quartz-to-metal seal; seals of this kind may be described as of the concentric tube type. For satisfactory sealing the molybdenum foil employed is usualy limited to a thickness of about 0.0018 inch. Seals of the concentric tube type are, however, expensive to construct.

A straight-forward pinch seal in which the molybdenum foil, attached at opposite ends to current-carrying conductors, is enclosed in a quartz tube of oval cross-section, which, after heating to render it plastic, is compressed on to the molybdenum foil, would materially reduce the cost of the seal. However, in order to maintain the current carrying capacity of such a seal it would be necessary materially to increase the thickness of the foil used. Any such increase in foil thickness would tend to render the seal liable to failure as a result of the non-uniform stress pattern across the foil. It is known to reduce the non-uniformity of the stress pattern across foils of the concentric tube type by feathering the edge of the foil by electrolytic etching. Indeed, this is now common practice in manufacturing quartz-to-metal seals.

The object of the present invention is to provide an improved quartz-to-metal seal of high current carrying capacity.

According to the present invention, a quartz-to-metal seal utilises molybdenum foil in planar form and of substantially circular shape (as hereinafter defined), having conductors connected to diametrically opposite points of, and extending oppositely from, the foil, the periphery of the foil being feathered in known manner. By this means non-uniformity of the stress pattern is largely avoided, as a result of the substantially symmetrical shape of the foil embedded in the quartz.

By specifying the foil as being of circular shape, we do not desire to be limited to a precise circle; any figure having a rounded periphery, e.g. oval, or a polygon having fewer or more than four sides, e.g. hexagonal, octagonal etc., with rounded corners may be used. The term "circular shape" is thus defined as any figure having a rounded periphery and includes a polygon having fewer or more than four sides with rounded corners.

By the use of molybdenum foil of circular form for the metal element in a quartz-to-metal seal, it has been found possible to use a single foil of thickness .005 to .009 inch, and in some cases as much as .015 inch, thus obtaining increased current carrying capacity for the seal. Furthermore, the seal may be made by inserting the foil with its oppositely extending conductors within a quartz tube of substantially oval form in cross-section, heating the tube until it becomes sufficiently plastic, and then collapsing the sides of the tube on to the foil. It is necessary to prevent exposure of the heated foil to an oxidising atmosphere, for example by passing an inert gas through the tube; in this case the collapsing of the tube may be effected by mechanically pinching the quartz on to the foil. Alternatively, one end of the tube may be sealed off and vacuum be applied to the other end; in this case the external pressure causes the collapse of the quartz on to the foil. The closed end of the tube is cut off later to expose the end of the lead.

Feathering of the rim of the foil may be effected by electrolytic etching, the foil being rotated with its edge immersed in a suitable electrolyte, this being a known method.

We thus have a flat circular or substantially circular foil with a feathered edge having current leads secured to it at diametrically opposite points in the axis of the seal. Such an embodiment provides in the seal a stress pattern that increases gradually towards the centre of the said foil.

In accordance with a further feature of our invention, the maximum permissible thickness of the foil is increased by the provision therein of a central aperture placed symmetrically with respect to the periphery of the said foil such that when the seal is made there is no metal at the centre of the foil and no metal/quartz stress at this point where the maximum stress would otherwise be located.

In addition there my be provided on each side of the foil in the vicinity of the aperture a thin apertured washer of refractory metal, for example molybdenum, which covers the rim of the aperture in the foil and prevents contact between the sharp edge of the aperture and the quartz in which it is embedded. In this case the effect appears to be to reduce the stress that would otherwise build up at the sharp edge of the aperture through the main foil this stress being taken up by the resilience of the washers overlapping the aperture of the foil.

Since the washers are already perforated, the quartz on either side thereof flows through the apertures in the foil and the washers and forms a tie-bar between the quartz lying on each side of the foil.

We have found that a molybdenum foil provided with an aperture whose diameter is from 10 to 20% of the foil diametre is useful in reducing the stress occurring in such a quartz-to-metal seal without unduly reducing the effective area of the conductive path of the foil and consequently its current carrying capacity.

The conductors extending from opposite ends of the foil at the seal will be connected to form leads extending from either side of the seal.

Figure 2:
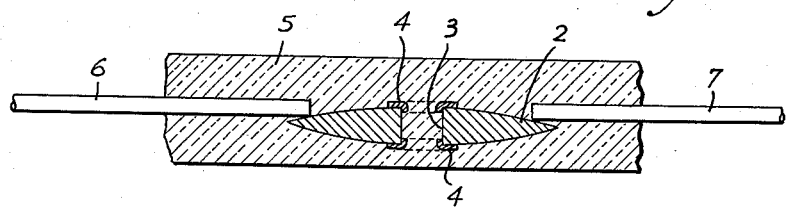

In order that the invention may be more readily understood an embodiment thereof will now be described with reference to the accompanying drawing, in which:

FIG. 1 shows a quartz-to-metal seal in which the circular foil is shown in plan form, and FIG. 2 shows the quartz-to-metal seal in which the circular foil is shown in section.

Referring to the drawing, the refractory metal foil shown circular as in FIG. 1, is tapered in cross-section as shown at 2, in a manner hereinbefore described.

Connected to the foil, by spot-welding or other means, and on a diameter lying along the axis of the seal, are the ends of the current-carrying electrodes 6 and 7 which, together with the foil 1, are completely embedded in the quartz 5 of the seal.

Provided symmetrically within the periphery of the foil 1 is the aperture 3 which has a diameter of from 10 to 20 percent of the total diameter of the foil and which is also completely filled by the quartz 5 of the seal to form a tie-bar between those portions of the said quartz lying on each side of the foil. The quartz 5 in FIG. 2 is shown also to fill the apertures in the thin resilient washers 4 of refractory metal placed on either side of the foil and over the aperture therein. The flow of quartz into the foil aperture during the sealing thereof into the quartz causes the profiling of the initially flat washers as shown in FIG. 2 such that the edges of the aperture in the foil are completely protected from the quartz of the seal and from any strains which may occur therein. Alternatively the washers 4 may, prior to the sealing operation, be separately profiled as shown.

What we claim is:

1. A quartz-to-metal seal comprising a planar foil of refractory metal, conductors being attached to said foil at diametrically opposite points adjacent to the edge thereof, said foil having a tapered cross-section tapering from a maximum thickness at the center and a thickness of from 0.003" to 0.015", said foil being substantially circular in plan and being provided with an aperture placed symmetrically within its periphery, said foil together with at least each end of the said conductors being embedded in the said quartz so that said quartz extends through said aperture to form a tie-bar between said quartz lying on each side of said foil.

2. A quartz-to-metal seal comprising a planar foil of refractory metal, conductors being attached to said foil at diametrically opposite points adjacent to the edge thereof, said foil having a tapered cross-section tapering from a maximum thickness at the center and a thickness of from 0.003" to 0.015", said foil being substantially circular in plan and being provided with an aperture placed symmetrically within its periphery, a perforated washer of refractory metal having a gauge thinner than that of said foil and located at each side of said foil, at said aperture, said metal foil and said washers being completely embedded in said quartz so that said quartz extends through said apertures in said washers and said foil to form a tie-bar between said quartz lying on each side of said foil.

References Cited in the file of this patent

UNITED STATES PATENTS

| | | |
|---|---|---|
| 356,795 | Slattery | Feb. 1, 1887 |
| 2,113,984 | Harris et al. | Apr. 12, 1938 |
| 2,667,595 | Noel et al. | Jan. 26, 1954 |